(12) United States Patent
Blankenship et al.

(10) Patent No.: US 8,758,184 B2
(45) Date of Patent: Jun. 24, 2014

(54) TRANSMISSION TEST SYSTEM

(75) Inventors: Gerald W. Blankenship, Saline, MI (US); Christopher Lake, Canton, MI (US); David Gonyea, South Rockwood, MI (US); Kevin Harris, Wendell, NC (US); Matthew Thompson, Franklinton, NC (US)

(73) Assignee: RedViking Group, LLC, Plymouth, MI (US)

( * ) Notice: Subject to any disclaimer, the term of this patent is extended or adjusted under 35 U.S.C. 154(b) by 381 days.

(21) Appl. No.: 13/214,794

(22) Filed: Aug. 22, 2011

(65) Prior Publication Data

US 2012/0046141 A1 Feb. 23, 2012

Related U.S. Application Data

(60) Provisional application No. 61/375,718, filed on Aug. 20, 2010.

(51) Int. Cl.
*F16H 3/44* (2006.01)

(52) U.S. Cl.
USPC .......................................... 475/269; 475/331

(58) Field of Classification Search
USPC ................... 475/11, 14, 269, 323, 331
See application file for complete search history.

(56) References Cited

U.S. PATENT DOCUMENTS

| | | | |
|---|---|---|---|
| 4,286,480 A * | 9/1981 | Dickie | 475/269 |
| 4,873,894 A | 10/1989 | Avery et al. | |
| 5,265,707 A | 11/1993 | Abe et al. | |
| 5,269,733 A * | 12/1993 | Anthony, III | 475/331 |
| 5,865,272 A * | 2/1999 | Wiggins et al. | 185/40 R |
| 5,966,997 A | 10/1999 | Halm et al. | |
| 6,047,596 A | 4/2000 | Krug et al. | |
| 6,099,254 A | 8/2000 | Blaas et al. | |
| 6,109,876 A | 8/2000 | Schreiber | |
| 6,393,904 B1 | 5/2002 | Krug et al. | |
| 6,481,968 B1 | 11/2002 | Fischer et al. | |
| 6,533,549 B1 | 3/2003 | Schreiber et al. | |

(Continued)

FOREIGN PATENT DOCUMENTS

| | | |
|---|---|---|
| WO | WO-97/41415 A1 | 11/1997 |
| WO | WO 98/19909 A1 | 5/1998 |

(Continued)

OTHER PUBLICATIONS

International Search Report—International Application No. PCT/US2011/048636, Mar. 27, 2012.

*Primary Examiner* — Justin Holmes
(74) *Attorney, Agent, or Firm* — Gifford, Krass, Sprinkle, Anderson & Citkowski, P.C.

(57) ABSTRACT

An automated system for testing a variety of transmissions and drive line gearbox components, and more particularly helicopter transmissions, for reliability, life expectancy, efficiency, and the like on a semi-automated basis. The system powers a unit under test with a pair of AC, variable speed drive motors connected to the transmission through relatively low speed gearboxes which in turn drive the input(s) of the test unit through geared cartridge spindles (GCSs) employing planetary gearset inputs driving a higher speed machine tool type spindle with an output chuck system which can automatically couple to adapters preloaded on the unit under test. Similar GCSs couple the outputs of the test unit to AC motors which act as generators to power the driving motors and thereby reduce the required electric power input to the losses in the system.

16 Claims, 15 Drawing Sheets

(56) References Cited

U.S. PATENT DOCUMENTS

| | | |
|---|---|---|
| 6,626,059 B1 | 9/2003 | Fischer et al. |
| 6,676,377 B1 | 1/2004 | Schreiber et al. |
| 7,066,040 B2 | 6/2006 | Bruggemann et al. |
| 7,740,107 B2 | 6/2010 | Lemburg et al. |
| 2002/0023483 A1 | 2/2002 | Reinisch et al. |
| 2004/0154416 A1 | 8/2004 | Bruggemann et al. |
| 2007/0007074 A1 | 1/2007 | Lemburg et al. |
| 2007/0169578 A1 | 7/2007 | Christensen et al. |
| 2007/0277610 A1 | 12/2007 | Landvogt et al. |
| 2010/0187067 A1 | 7/2010 | Hasenkamp et al. |

FOREIGN PATENT DOCUMENTS

| | | |
|---|---|---|
| WO | WO-99/60362 A1 | 11/1999 |
| WO | WO-99/01850 A2 | 12/1999 |
| WO | WO-2003010504 A1 | 2/2003 |
| WO | WO-2004081373 A2 | 9/2004 |

* cited by examiner

TRANSMISSION TEST SYSTEM

CROSS-REFERENCE TO RELATED APPLICATIONS

This application claims priority of U.S. Provisional Patent Application 61/375,718 filed Aug. 20, 2010, the contents of which are incorporated herein by reference.

FIELD OF THE INVENTION

This invention relates to systems for testing transmissions and other gearboxes for reliability and life expectancy and more particularly to a system for testing a variety of different forms of helicopter transmissions, sequentially in a semi-automated manner.

BACKGROUND OF THE INVENTION

Prior art systems for testing transmissions and the like for reliability, life expectancy, efficiency, and the like have typically been designed to test a single form of transmission. The transmissions have typically been manually loaded into a test machine driven by electric motors, with connectors manually inserted between the units and the motors. The outputs of the transmissions have been loaded by manually connecting the transmission outputs to a loading device such as a clutch, dynamometer or brake system. After the testing has been completed, the unit under test must be manually disconnected from the drive and load device.

This process is very time consuming and labor intensive and the production rates are very low. If a different form of transmission needs to be tested, a separate test machine design needs to be generated, built and provided for that transmission. In situations where multiple transmission types are to be tested in a single facility, the plant space and capital investment required for the separate test modules is extensive.

The primary test machine gearboxes used in these prior art test systems are required to operate at the high speeds of the transmission inputs. In the case of helicopter transmissions, the power ranges up to about 4500 horsepower and speeds ranging up to 25,000 rpm. These gearboxes are accordingly expensive and difficult to maintain.

SUMMARY OF THE INVENTION

The present invention is broadly directed toward a system and apparatus for testing transmissions and like gearbox products and more particularly helicopter transmissions. The system comprises means for loading the units to be tested into a test module in a rapid and semi-automated manner, to provide efficient drive and loading in simulation of operating conditions, and to remove the unit under test in a semi-automated manner. Moreover, each test module is designed to receive a variety of different related designs of gearbox products with relatively minor modifications of the test module required for changeover between different forms of units to be tested.

In achieving these goals the system incorporates a unique method of applying and removing power from high speed, high horsepower transmissions and the like utilizing a unique geared cartridge spindle (GCS) which has utility in systems other than transmission test facilities.

In a preferred embodiment of the system of the present invention, subsequently disclosed in detail, a unit to be tested is loaded it onto a transportable test fixture (TTF) specifically designed to accommodate the particular type of unit under test. In a preparation area various forms of instrumentation such as sensors and the like, lubrication connectors, and adapters for connecting the inputs and the outputs of the unit under test to the GCSs, which in turn connect to the test system, are installed on the unit. The unit may then undergo various preliminary testing steps such as electrical testing and verifying alignment. The TTF will then be loaded onto a wheeled transport cart which is used to move the unit from the preparation area to a flexible test module (FTM). The FTM includes two sets of clamps, which engage the TTF depending on its design, in a precise manner and lift the TTF off its cart which may then be removed.

The FTM itself incorporates several motor generators. In the preferred embodiment of the invention, the motor generators are AC devices with their speeds controlled by variable frequency drives. The preferred embodiment of the system operates off of an AC supply line which changes the incoming power into direct current through a converter and feeds a DC bus which services all of the motor generators. Each motor generator has a separate inverter to convert the DC to AC and a variable frequency drive for controlling its speed. When testing a given unit, certain of the motors are connected to the inputs of the transmission or gearbox and others are connected to the outputs and act as the loading device. The output driven motor generators feed electrical power through their inverters back to the DC bus so that the total electrical power requirements for the system are minimized.

The FTMs are equipped with custom gearboxes which accommodate each module to the inputs and outputs of the unit under test primarily through GCSs. The gearboxes are removable from the FTM and each gearbox module is preferably designed to connect to the same motor generators and to accommodate several different types of units to be tested in terms of the positions and orientations of their connectors to the unit. If a wide variety of types of units are to be tested, it may be necessary to provide a plurality of different gearboxes to accommodate all of the styles of units to be tested, but preferably only a few gearbox designs will accommodate the widest arrangement of units to be presented to the system.

The system employs a number of GCSs. These represent a common design used in the preferred embodiment of the system to couple the outputs of the gearboxes to the units under test and to connect the outputs of the units under test to the loading electrical generators which receive the output power from the transmission and generate power which is fed back to the DC bus to decrease the net electrical power input into the system to the losses incurred in the feedback loop.

These GCSs contain all the high-speed gearing required by the system so that they can be inserted in a "plug and play" fashion into the lower-speed primary gearboxes, which present position and orientation for each transmission. The GCSs used in the preferred embodiment of the invention may transmit power ranging up to about 3000 horsepower at speeds ranging up to 23,000 rpm.

Each GCS consists of a planetary gearset coupled to a high speed, machine tool type spindle. The planetary gearset can handle the high power levels in a compact configuration and provides a self-piloting configuration that does not impose any radial forces on the spindle drive shaft. The planetary gearset is comprised of a ring gear input, a sun gear output, and a fixed planet carrier. The sun gear drives the input to the high-speed spindle. With a 4:1 ratio, the planet bearings will rotate at approximately two thirds of the spindle velocity while all other bearings within a flexible test module will run at one fourth or less of the spindle velocity.

The output of each GCS, or the input when the GCS is connected in a speed reducing configuration, is a chuck system drivingly connected to the spindle. The chuck is supported for extension and retraction relative to the other components of the GCS along the central axis of the GCS for connecting and disconnecting the GCS to the adapters on a unit under test (UUT) by a pneumatic power system. Pneumatic power is also applied to the chuck to move it between an open position, in which it is adapted to engage an adapter and a closed position. Actuating power is supplied to the body of each GCS through an integrated pneumatic connector. In addition to opening and closing the chuck and advancing and retracting the chuck, the pneumatic power drives a seal plate longitudinally along the central axis of each GCS into engagement with a mating plate on the chuck base in order to connect the pneumatic power to the chuck. The seal plate is extended and retracted by a series of pneumatic actuators which are radially spaced around the GCS and have their piston rods connected to the seal plate.

The adapter which is connected to the unit under test has a central locating knob which faces the chuck and is engaged by the chuck. The face of the adapter surrounding the locating cone has several radial lobes, three in the case of the preferred embodiment. Power is transferred from the chuck body to the adapter hub through six spring loaded drive pins which are arrayed at spaced angular intervals about the face of the chuck and project toward the adapter plate. When the chuck is advanced against the adapter, three of the drive pins will usually engage the radial slots and three of the pins will project against the adapter face forward of the slots and be forced to retract under their spring biases by contact with the adapter.

Once the chuck is in contact with the adapter hub, pneumatic power is removed from the drive piston to stop advancing motion of the chuck, the adapter hub central locating knob is axially secured to the chuck using a ball lock and torque is applied to the chuck base through the spindle. The rotating chuck body slips radially relative to the adapter hub until the three engaged drive pins each contact the end of their engaged radial slots. At this point the three compressed drive pins extend into the opposed ends of each of the slots removing potential backlash and allowing reverse rotation through the spindle.

Testing power is then transferred from the spindle to the unit under test through the adapter hub. During testing, attached sensor outputs are provided to an operator attended machine control and data analysis and recording system. When the testing is completed, pneumatic power releases the ball lock and withdraws the chuck from the adapter hub to allow the unit under test to be removed.

The FTM incorporates a motor structure which supports the drive and regenerative motors in spaced relation for connection to gearboxes. The UUTs, which are connected to the gearbox when the chucks on the GCSs are pneumatically advanced, are supported beneath the main mast framework which is itself supported above the unit under test allowing the mast of a helicopter transmission to extend upwardly through an aperture in the framework. The top of the main mast structure supports an actuator for use with helicopter transmissions which connects to their masts to loading motor generators in a manner similar to the way the GCSs connect to the adapters. Thrust is also applied through an integrated hydraulic actuator which imposes load on the main mast in an axial direction. The tail output of a helicopter transmission is connected to a GCS which provides a reduced speed output through a gearbox to a motor generator smaller than the others.

After the test routine has been completed, the chucks of the GCSs and the main mast actuator are retracted, the wheeled cart is repositioned under the transportable test fixture and its loaded unit under test, and the unit under test is removed from the flexible test module and then from the transportable test fixture.

In the preferred embodiment of the invention the GCS may be used both as a gear reducing unit and a speed increasing unit. For example, in certain helicopter transmissions having a tail output shaft, an adapter may be connected to that shaft which is used to drive the GCS from the chucking end, through the high speed spindle, and the planetary gear system, to provide a reduced output speed which may be applied to a load motor through the gearbox.

The GCS has utility in a variety of systems other than transmission or gearbox testing. For example, it might be employed in tool changing automatic machining systems, robotic manufacturing systems, and the like.

BRIEF DESCRIPTION OF THE DRAWINGS

Other objects, advantages, and applications of the present invention will be made apparent by the following detailed description of a preferred embodiment of the invention. The description makes reference to the accompanying drawings in which.

DETAILED DESCRIPTION OF THE PREFERRED EMBODIMENT

While the system of the present invention is useful with the accelerated life and efficiency testing of a variety of gearboxes, the preferred embodiment of the invention is designed to test a variety of helicopter transmissions, with their special features such as rotor blade masts and tail drives.

Figure 1:
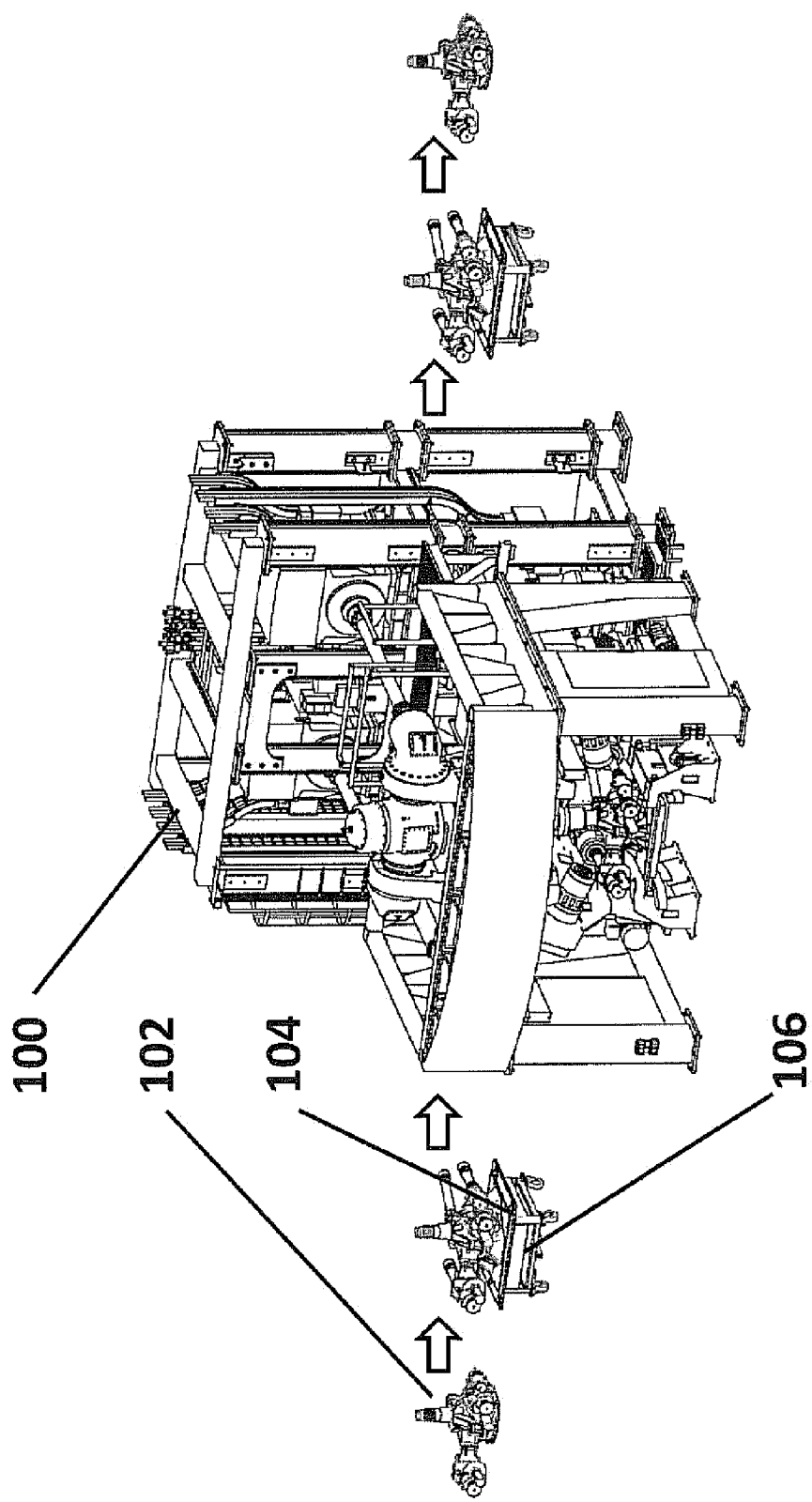
FIG. 1 is a schematic view of the apparatus employed in the preferred embodiment of the transmission testing system, illustrating the flow of the transmissions through the system.

FIG. 1 illustrates in schematic form the process of preparing a particular transmission under test (a unit under test or UUT) 102 for testing, transporting it to a flexible test module (FTM) 100 and associated controls and analysis equipment, and removing the UUT after testing. A UUT 102 will be loaded onto a transportable test fixture (TTF) 104 that is specially designed to support the UUT in proper orientation for testing. The TTF will incorporate an RFID tag which identifies the UUT and the TTF, an instrumentation junction box for coupling with the UUT, and a lubrication manifold for providing necessary lubrication required during the test. The TTF is then loaded on a wheeled cart 106 and moved to a staging area where adapters, which will later be disclosed in detail, are connected to the various inputs and outputs of the UUT. The cart is then moved into the test cell area 100 where it is clamped into operating position and the necessary GCSs are connected to the UUT through the adapters.

The UUT is then powered through drive motors and loaded through motor generators and experiences a test routine with the sensors forming part of the instrumentation transmitting the measurements under testing to an operator attended control room which performs data logging, detailed analysis of the tests, manages test profiles, and displays all the pertinent information to the operator. After testing has been completed, the TTF is unclamped from the FTM and moved out of the test cell area. The UUT is then removed from the TTF. If it passed the test process, it is moved to a shipping area. If it didn't pass the test process, it is shipped to a repair area.

Figure 2:
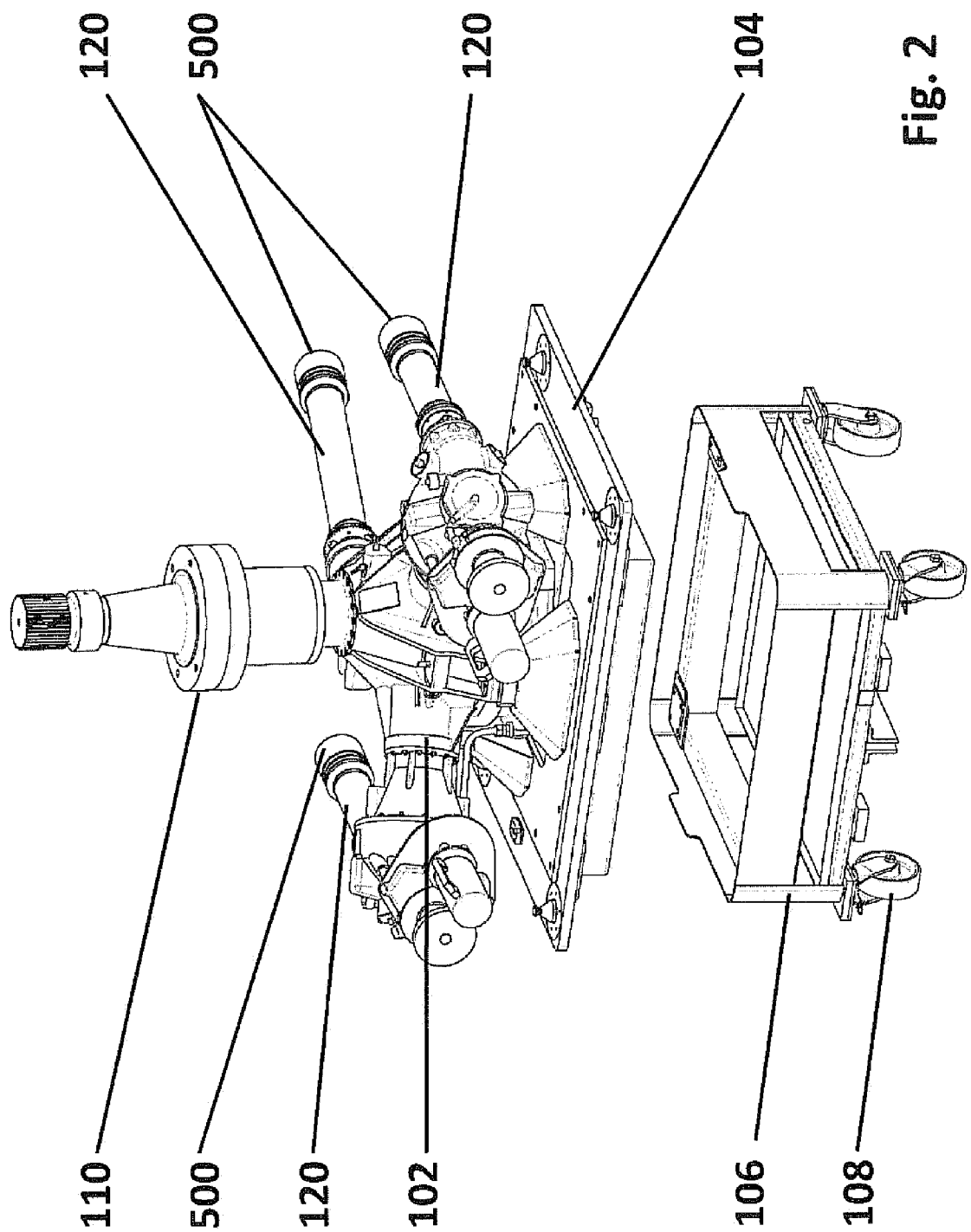
FIG. 2 is a perspective view of a unit under test supported on a transportable test fixture and positioned above a transportation cart on which the transportable test fixture will be loaded for processing.

FIG. 2 illustrates, in exploded form, a helicopter transmission 102 to undergo testing positioned over a transportable test fixture 104, custom designed to accommodate the type of transmission to be tested, and a transportation cart 106 supported on casters 108 which allows the transmission and the TTF 104 to be manually moved into a staging area and then into the test cell area 100.

Figure 6:
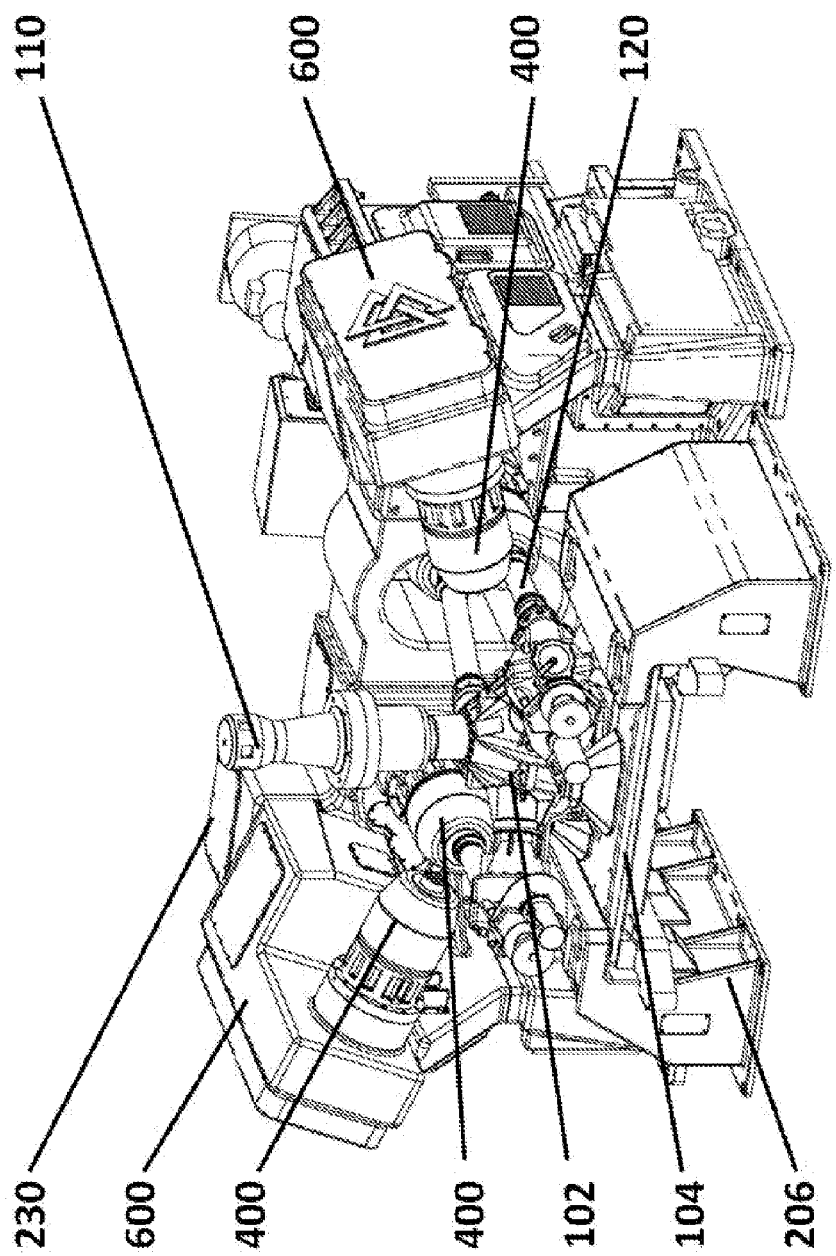
FIG. 6 is a perspective view of a UUT supported on a clamped TTF and connected to its gearbox.

The next step is to connect adapters to the inputs and outputs of the transmission 102 which will connect to the FTM through GCSs to power the inputs to the transmission and act as loads for the outputs. In FIG. 2, three of the adapters 500, which are supported on extension shafts 120, are visible. A main mast adapter 110 is also supported on the mast of the UUT 102 (FIG. 6). This adapter shaft incorporates all connection, instrumentation, and geometry required to connect the mast to the FTM and to automatically connect, apply torque, and apply thrust to the UUT.

Figure 3:
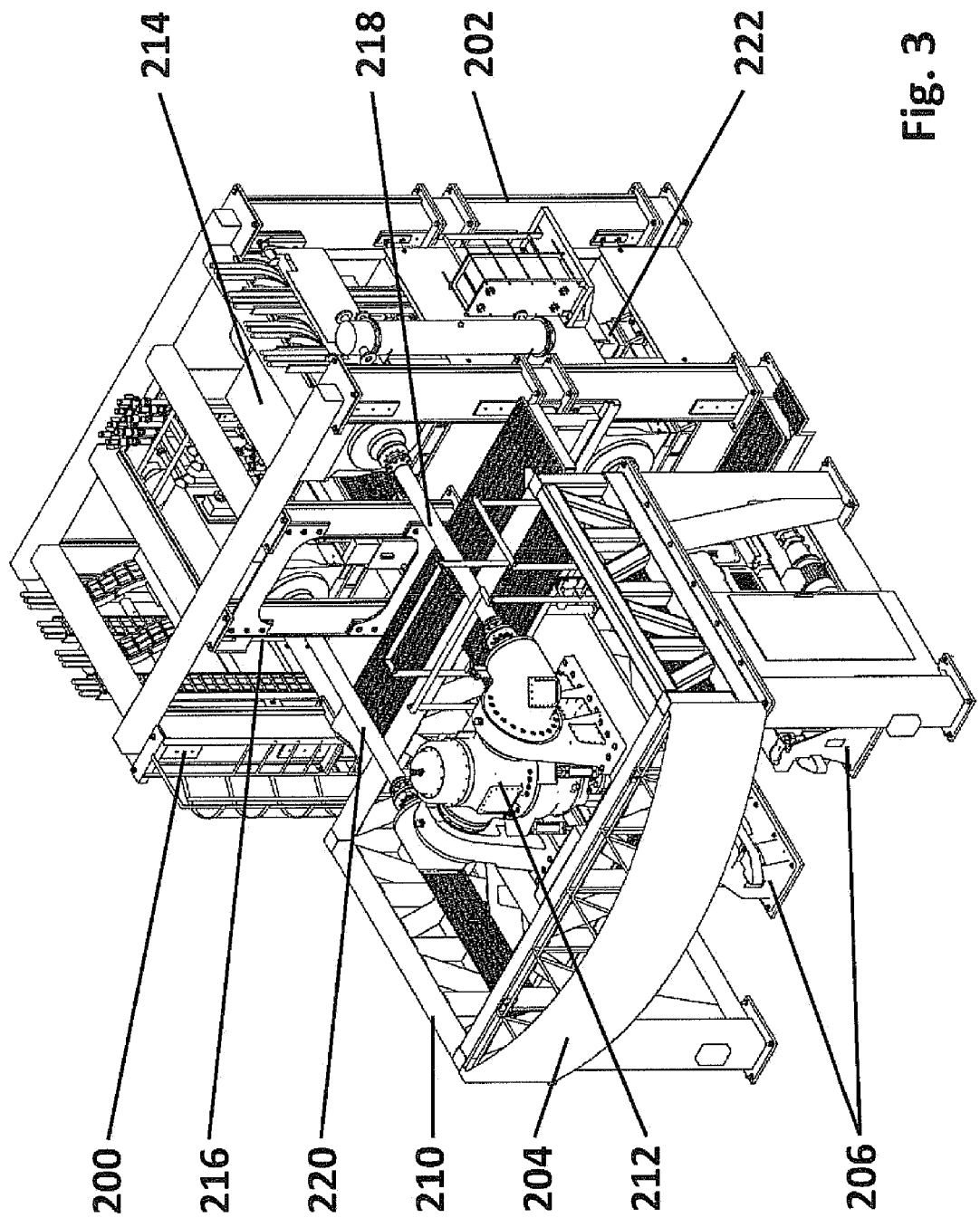
FIG. 3 is a perspective view from the top and the right side of a flexible test module formed in accordance with the present invention.
Figure 4:
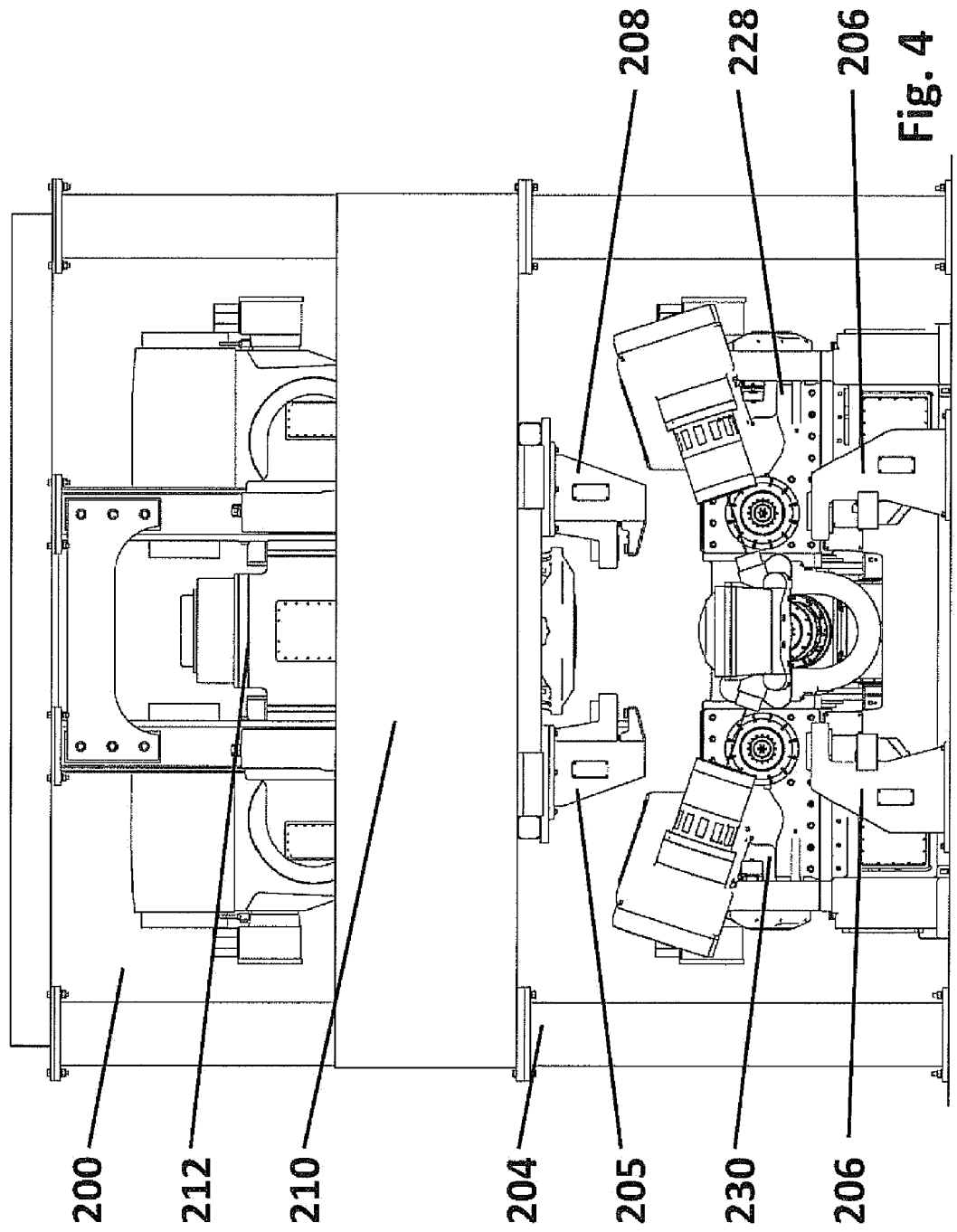
FIG. 4 is a front view of the flexible test module of FIG. 3.
Figure 5:
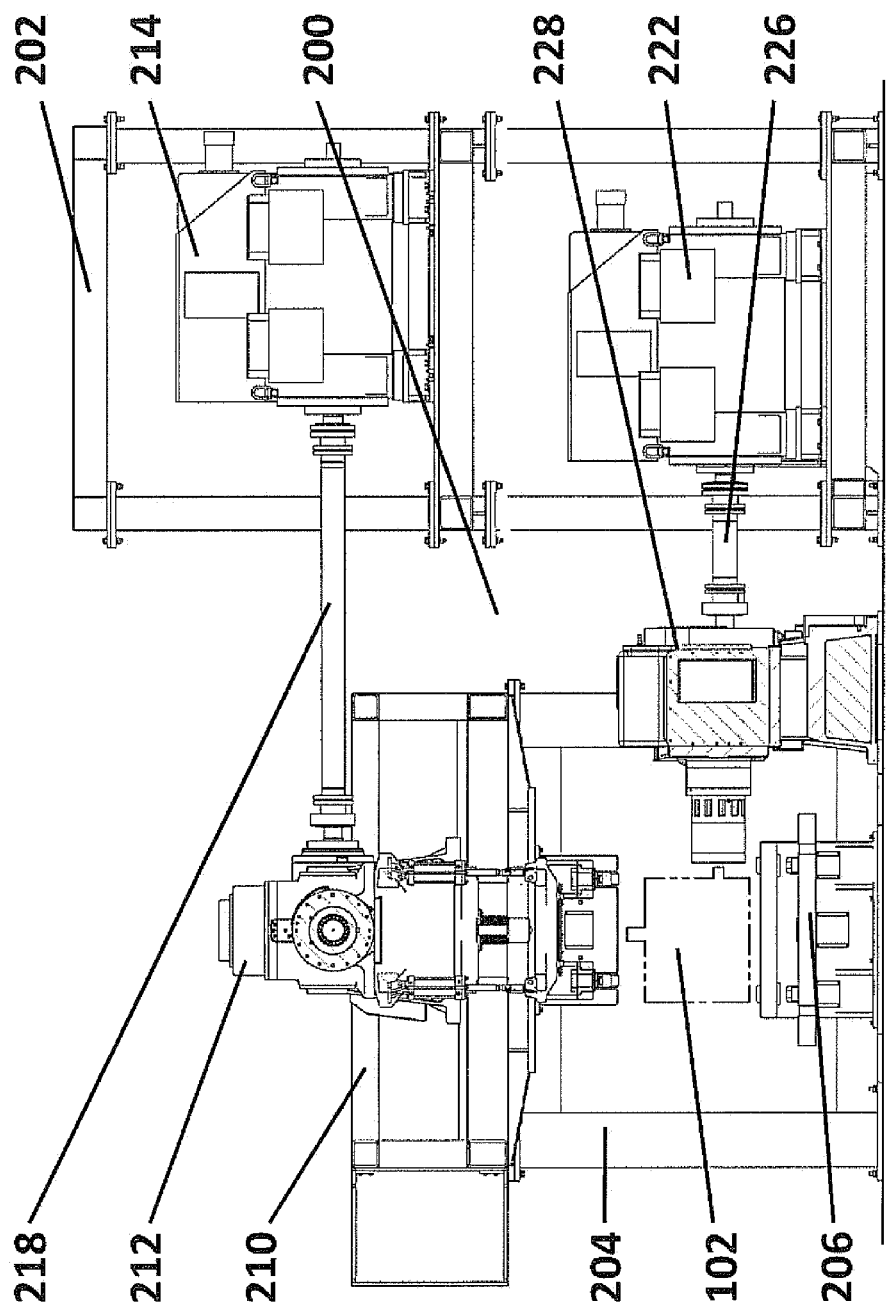
FIG. 5 is a side view of the flexible test module of FIG. 3.

The UUT, supported on the cart 106, is then moved into the FTM, generally indicated at 200 in FIG. 3, in a front view in FIG. 4, and in a side view in FIG. 5. The FTM 200 broadly comprises two sections, a powerhouse section 202 which houses the motor generators and a UUT support structure 204. The support structure 204 includes a pair of opposed clamps 206 which engage and locate the opposed sides of the TTF supporting the UUT 102. Each side includes a hydraulic cylinder attached to guide rods (not shown) that lift the TTF off of the cart and insert it into a locking cylinder (not shown), on the clamping structure which precisely positions and locates the TTF and UUT for testing. The UUT is free of the cart 106 at that point and the cart may be removed during the testing period.

For certain units under test with mast side mounting features, rather than clamping the units with the clamps 206, they are locked in position in the FTM by a pair of upper clamps 208 supported beneath a horizontal bridge 210 forming part of the UUT support structure 204. These clamps 208 engage and align the TTF and UUT in the same manner as the lower clamps.

The adapter 110 is loaded on the transmission mast. The mast adapter is engaged by a main mast torque and thrust unit 212, supported on top of the bridge 210, which comprises a right angle bevel gear connector to two motor generators 214 and 216 which are supported in the powerhouse structure. The motors 214 and 216 are connected to two spaced inputs on the torque and thrust unit 212 by shafts 218 and 220.

The power house structure 202 supports another pair of input motors 222 and 224 (FIG. 9) on the lower level. These motors connect through shafts 226 to primary gearboxes 228 and 230 which are configured to accommodate a particular UUT and are sufficiently adjustable to accommodate similar UUTs. These gearboxes may be replaced with configurations which will service another range of gearboxes to be tested when necessary.

A UUT 102, supported on a TTF 104, engaged by clamps 206, and connected to a gearbox 230, by GCSs 400, is shown in FIG. 6. The gearbox 230 is adaptable to service a range of different helicopter transmissions. For example, the sections 600 do not connect to the UUT shown in FIG. 6 but are used in connection with other forms of transmissions. These sections may be removably attached to the gearbox 230, which is shown without any attachments in FIG. 9.

Figure 7:
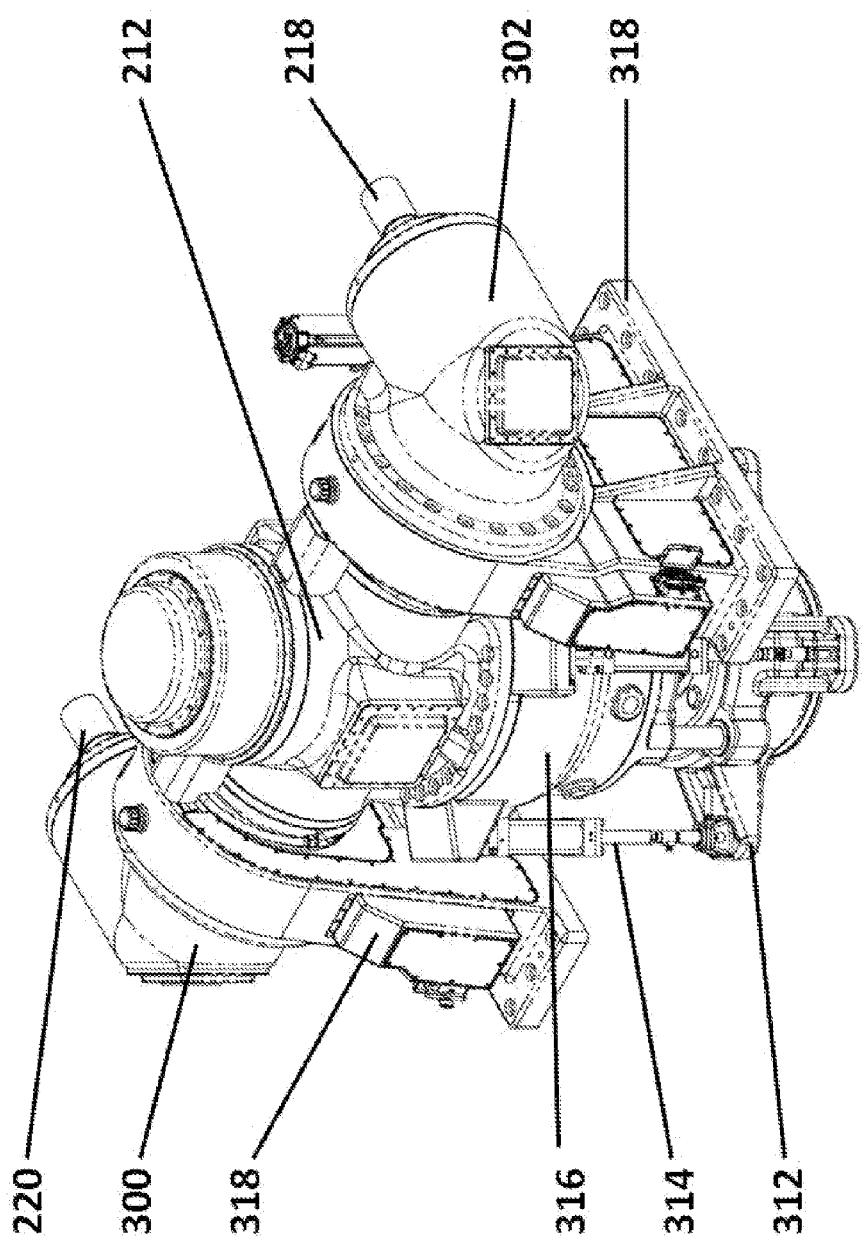
FIG. 7 is a perspective view, from the top of the main mast torque and thrust unit employed in the flexible test module.
Figure 8:
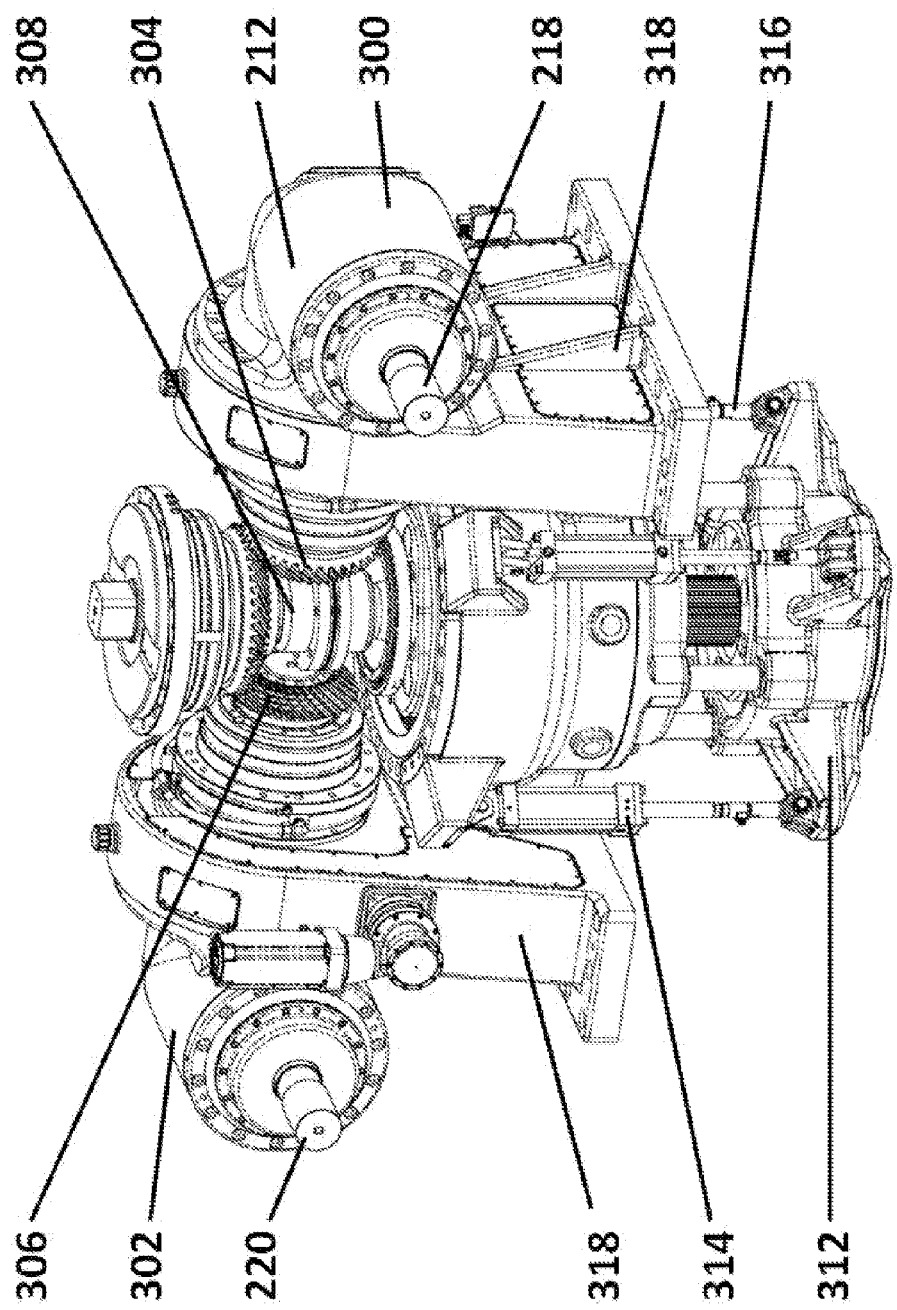
FIG. 8 is a side perspective view of the main mast torque with the bevel gear set cover removed.

The main mast torque and thrust unit 212 is illustrated in a top perspective in FIG. 7 and with the gear cover removed in FIG. 8. The unit comprises a spaced pair of right angle drives 300 and 302 which connect through the shafts 218 and 220 to the motor generators 214 and 216. Each of the right angle drives connects to a generally vertically aligned shaft driven by the mast adapter 110. The input of right angle drives 300 and 302 are driven by bevel gears 304 and 306, both of which are driven by a bevel gear 308 connected to the generally vertically aligned output shaft of the unit 212. A thrust plate 312 is connected to the same shaft and is driven along the axis of the mast adapter 110 by four hydraulic actuators 314. The output shaft of the unit 212 also incorporates a planetary gear set speed reducer 316.

The main rotor masts of the range of helicopter transmissions to be tested by the FTM 200 are not all oriented exactly vertically with respect to the normal orientation of their transmission bodies, in use, as are provided by the TTFs 104. The angles with respect to the vertical may range up to about +/−10°. To accommodate this variation the unit 212 is pivotably adjustable about a horizontal axis aligned through the axis of the bevel gears 304 and 306, about two pedestals 318 which support the unit 212. The TTFs 104 support the transmissions so that the masts of the different transmission types all project in the plane of adjustability of the shaft connector of unit 212.

The helicopter mast, through the adapter 110, is rotationally loaded by the force required to turn the motor generators 214 and 216 and simultaneously axially loaded by the force exerted on the thrust plate 312 by the actuators 314.

Figure 9:
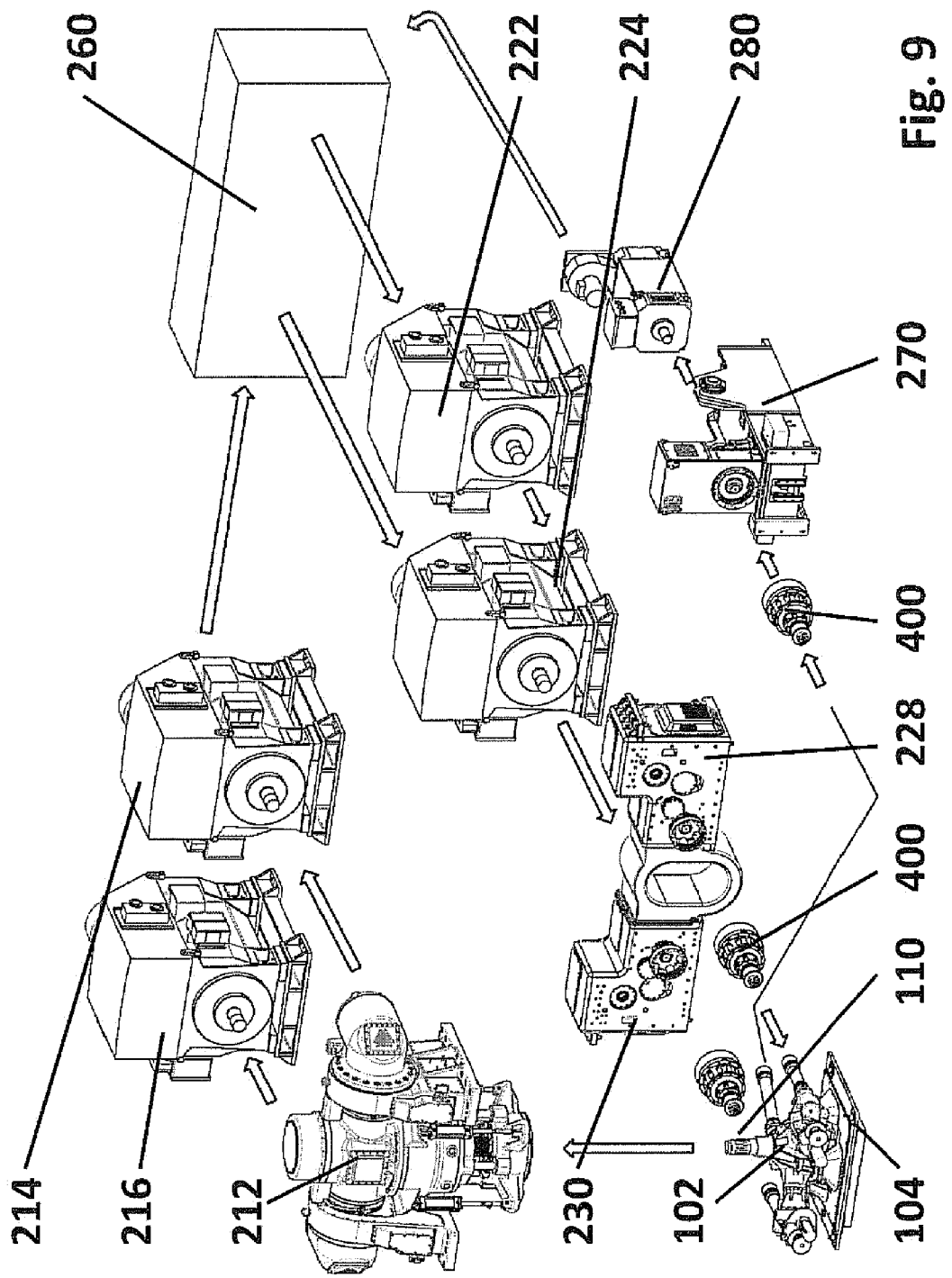
FIG. 9 is a schematic diagram of the mechanical and electrical power flow through a flexible test module.

The gearboxes 228 and 230, as well as a gearbox 270 which applies load to the helicopter tail rotor drive, are uniquely designed for each UUT type to be tested so as to apply driving power to the UUT inputs and to receive power from the UUT tail drive in a manner that accommodates the position and orientation of each of the shafts of the UUT. The gearboxes 228 and 230 have connections to the drive and driven motors as schematically illustrated in FIG. 9. The outputs of these gearboxes are provided to the UUT through GCSs 400. A particular gearbox combination may be used with several styles of similar transmissions and the entire gearbox is removable so that it may be replaced with an alternative form of gearbox for accommodating other transmissions.

The power flow through the FTM 200 is illustrated in FIG. 9. A UUT 102 supported on a TTF 104 is provided with input power through a pair of GCSs 400 which connect through a gearbox 230 and 228.

Figure 17:
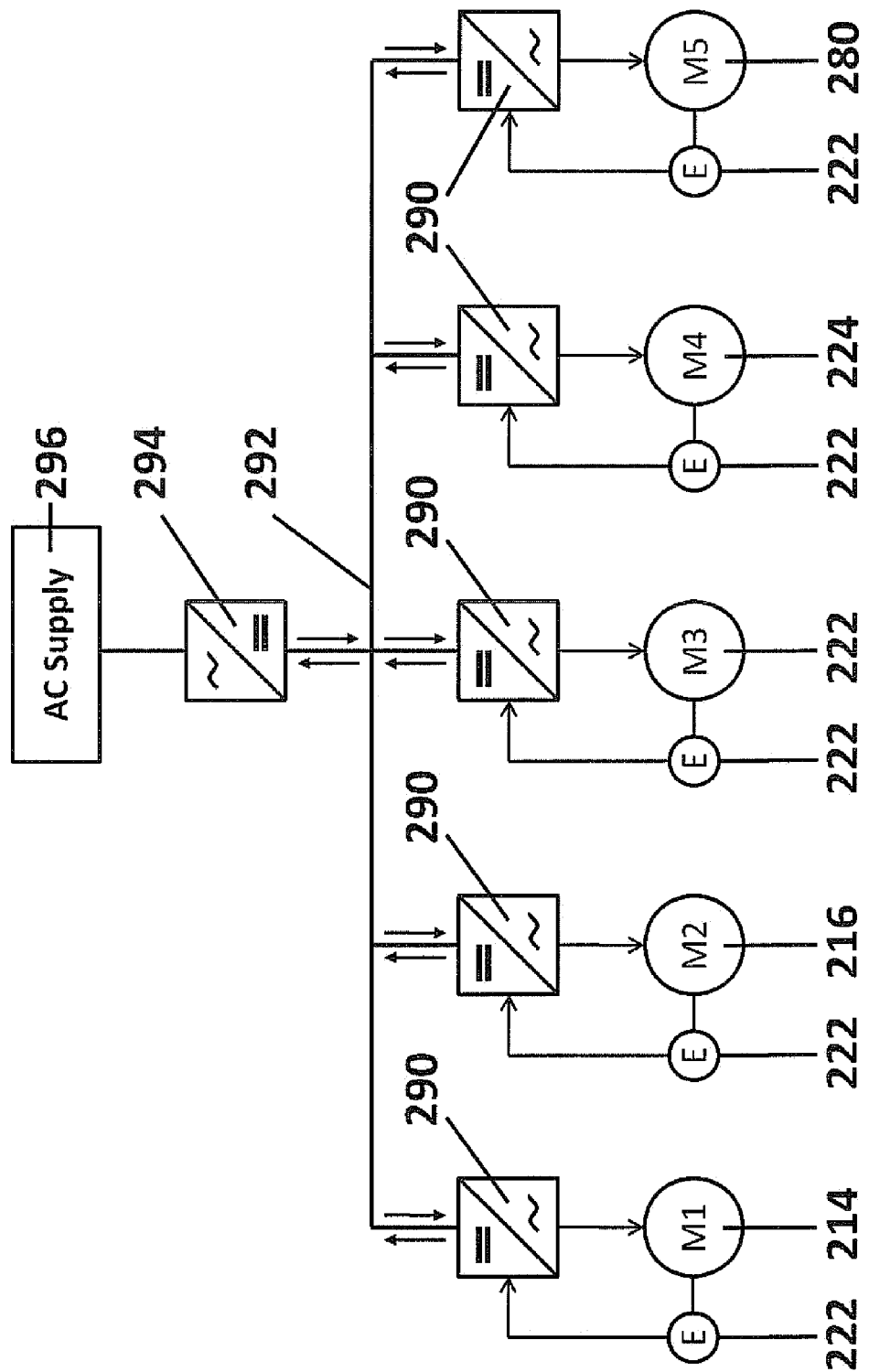
FIG. 17 is a schematic illustrating the electric power system of the FTM.

The inputs to the gearbox are from motor generators 224 and 222 which receive electrical power from a control panel 260. As shown in FIG. 17 each of the motor generators 280, 214, 216, 222 and 224 is powered by a separate unit 290 which includes an inverter for converting power on a DC bus 292 to AC and a variable generate generator to control the speed of its associated motor-generator. Each motor-generator has a speed sensor 292 which feeds back to the associated unit 290 to meet speed commands provided from the controller 260. The DC bus is powered by an AC-DC converter 294 from an AC power line 296, as well as feedback from the line loading motor generators.

The mast output adapter 110 of the UUT 102 is connected to the mast actuator 212 which connects the shaft rotation to the two motor generators 214 and 216 which provide the load to the rotor while the hydraulic actuators associated with the mast actuator apply axial thrust to the mast. The motor generators 214 and 216 provide their electrical outputs back to the control system 260.

The tail shaft output of the UUT 102 is also provided through a GCS acting as a speed reducer to a gearbox 270 which drives a smaller motor generator 280 which also provides its output power to the control panel 260.

Geared Cartridge Spindle (GCS)

Figure 10:
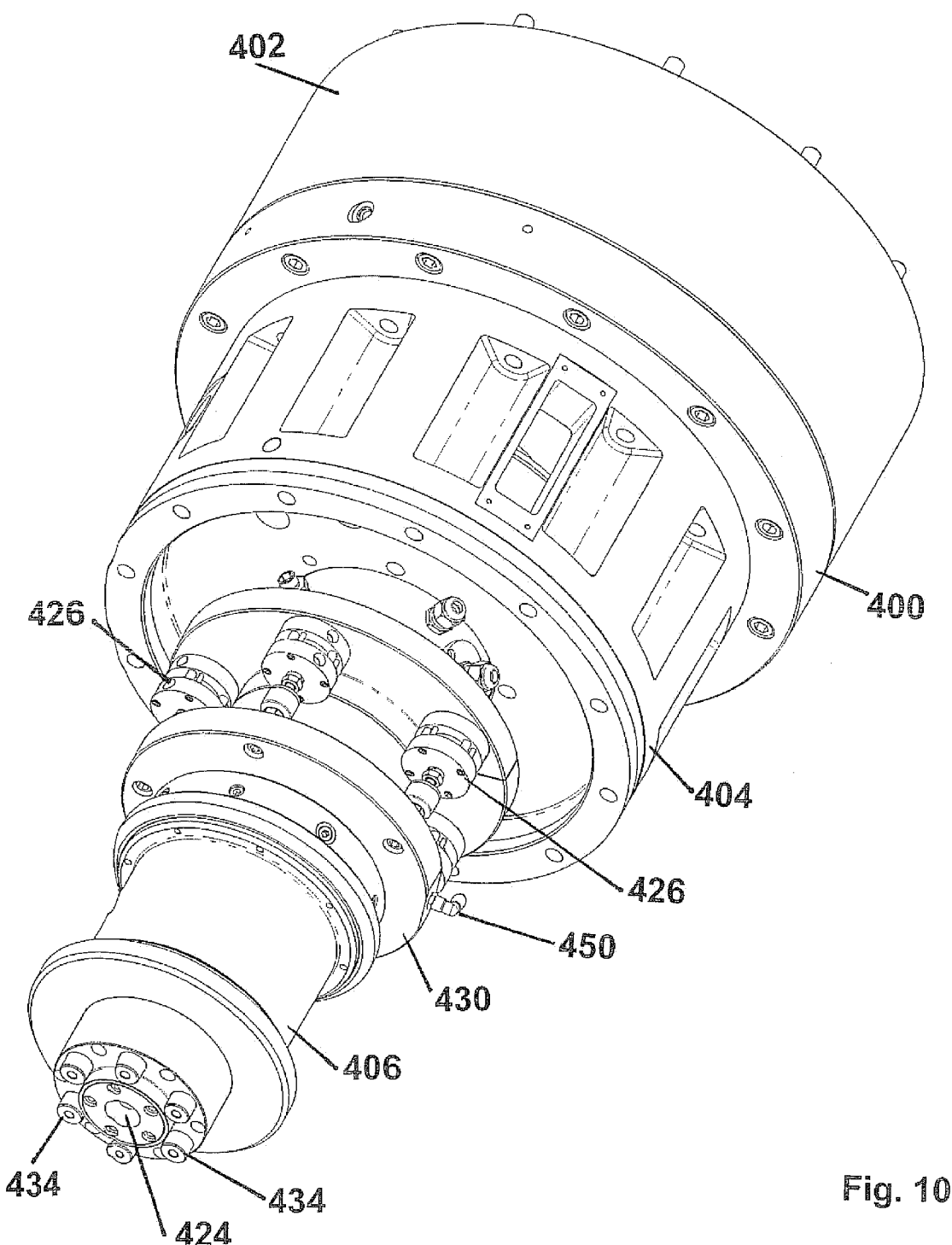
FIG. 10 is a perspective view of a geared cartridge spindle.
Figure 11:
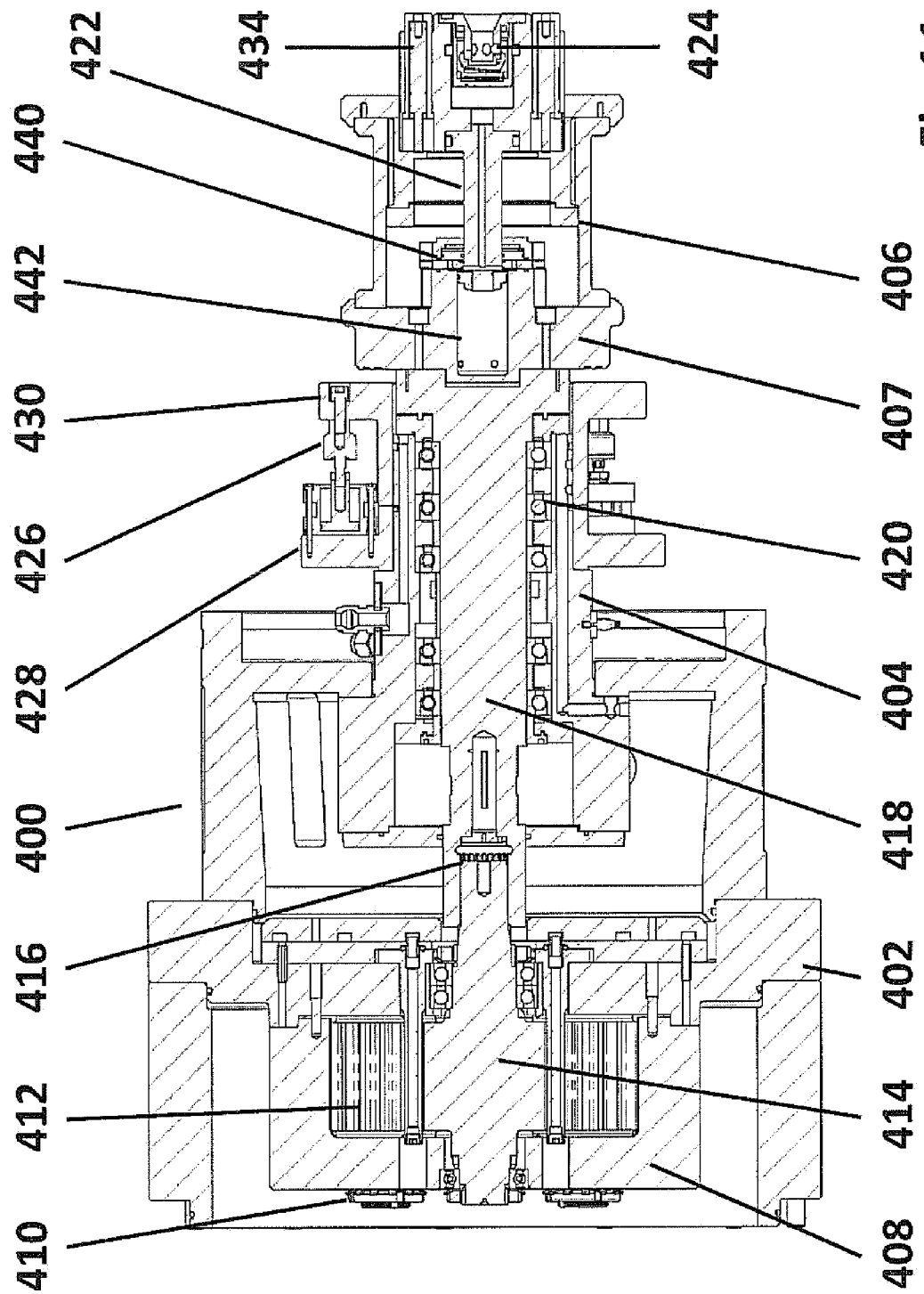
FIG. 11 is a longitudinal, cross-sectional view of a geared cartridge spindle with the chuck in an extended position.
Figure 12:
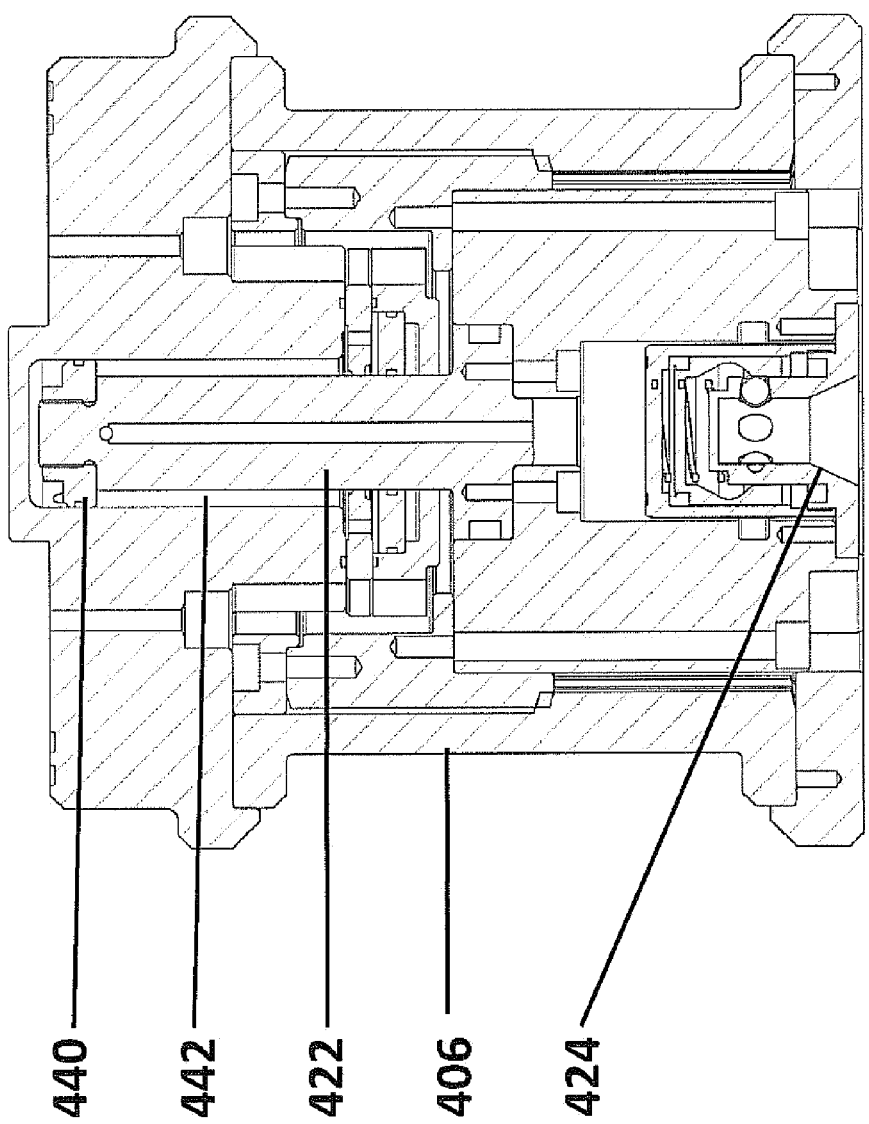
FIG. 12 is a cross-sectional view through the chuck end of a geared cartridge spindle with the chuck retracted.
Figure 13:
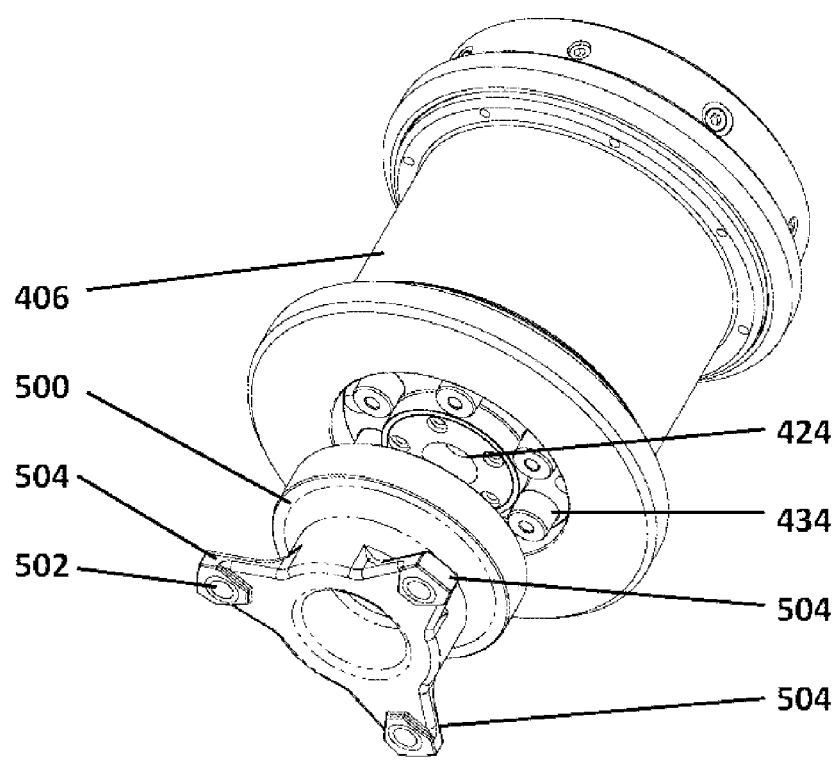
FIG. 13 is a perspective view of the chuck end of a geared cartridge spindle positioned opposite to an adapter which may be engaged by the geared cartridge spindle.

The GCSs are illustrated in FIG. 10 which shows a perspective view of a GCS; FIG. 11 which is a cross section through the central axis of a GCS showing the chuck end in an extended position; FIG. 12, a section through the chuck in a retracted position; FIG. 13 which is a perspective view showing the end of the chuck forming part of the GCS positioned opposite an adapter which has been connected to the UUT in the prep area; and FIGS. 14, 15, and 16 which illustrate the adapter hub in perspective, in an end view, and in a top view, respectively.

Each GCS, generally indicated at 400, is comprised of a planetary gear section 402, a high speed machine tool type spindle 404, and a chuck support section 406. In the preferred embodiment of the invention the planetary gear set preferably provides a gear ratio of approximately 4:1. The GCS 400 is generally used in the present system to increase the speed of a relatively low speed output from a gearbox, but in the case of a helicopter tail output the GCS is used in a reverse manner to accept a higher speed from the transmission tail output and provide a lower speed output to the primary gearbox and thus to a motor generator acting as a load on the tail output.

The input to the GCS (or output in case of the tail output) is provided to a ring gear (not shown) of the planetary gear assembly through coupling elements in the primary gearbox over the input end of the planet carrier. A sun gear 414 driving through an integrated shaft provides the output of the planetary gear set or, in the case of the tail gear, the input. The sun gear shaft 414 is joined by a flexible coupling or splined connector 416 to the shaft 418 of the spindle 404. The shaft is supported in a series of high speed roller bearings 420 which ensure precision rotation and support of the high-speed spindle.

The output end of the spindle rotates the chuck 406. The base of the chuck 407 is rigidly connected to the output end of the spindle shaft 418 and receives its support from the spindle shaft. The forward face of the chuck 406 comprises a locating cone 424.

A plurality of pneumatic seal plate actuators 426 have their bases supported about the spindle on a mount plate 428. The rods of the spindles connect to a seal plate 430 which is supported for movement along the central axis of the GCS 400 on the spindle 404 body.

Six spring loaded drive pins 434 are radially spaced at the forward end of the chuck around the locating cone 424. The drive pins 434 are slidably supported for axial motion between an extended position, illustrated in FIG. 10, and a retracted position in which their far ends are withdrawn behind the cone 424. Internal springs in each of the pins 434 bias them toward the extended position.

Figure 16:
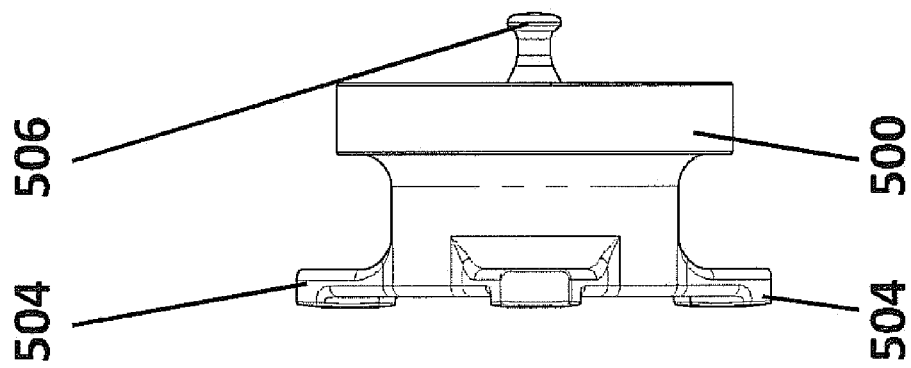
FIG. 16 is a top view of the adapter.
Figure 15:
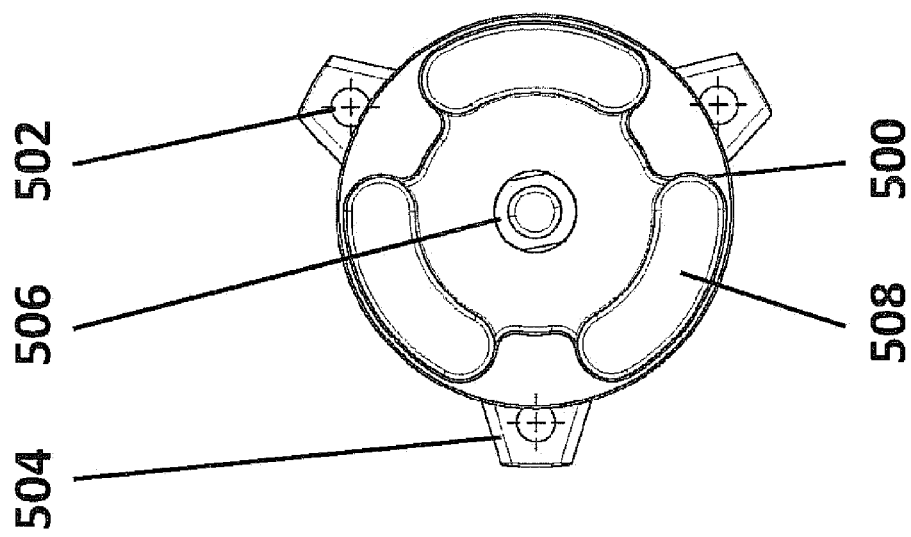
FIG. 15 is an end view of the adapter.
Figure 14:
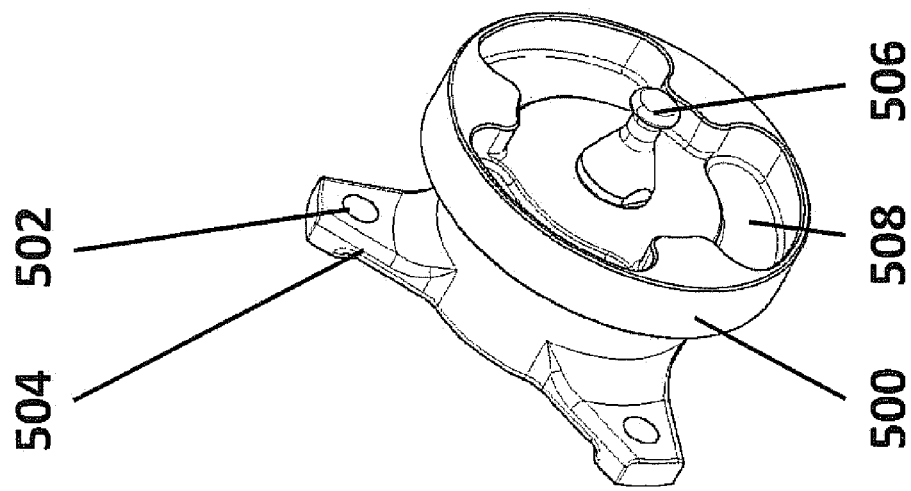
FIG. 14 is a side perspective view of the adapter.

The adapter plates, generally indicated at 500, which are secured to the unit under test in the preparation stage, are illustrated in FIGS. 14, 15, and 16. The adapter plates 500 are joined to the unit under test by bolts passing through holes 502 extending radially outward from the body of the adapter 500 at equal angular intervals.

The end of the chuck system 406 comprising the locating cone 424 and the driving pins 434 is slidingly supported for axial motion along the GCS between a retracted position, illustrated in FIG. 12, and an extended position, illustrated in FIG. 11. This operating end moves along splines so that the rotation of the chuck 406 is transferred to the extending end. The axial motion is driven by a piston 440 which moves within a cylinder 442 under pneumatic power.

When a unit under test is to be loaded into or out of the FTM, the head of the chuck is retracted. To connect the GCS to the unit under test through one of the adapters 500, pneumatic power is applied to the cylinder 442 to move the head to its extended position. As the head advances, the locating cone 424 moves over an adapter hub locating knob 506 extending centrally from the face of the adapter hub 500. The face is formed with three recessed slots 508 which are radially spaced about the knob 506 with each slot extending for about 60 degrees when there are six driving pins 434 formed on the output end of the chuck 406. The ends of the slots 508 are rounded and the spacing between a pair of slots 508 is such that an adjacent pair of drive pins will fit into the two ends of each slot.

When the head end of the chuck 406 is advanced through the piston 442, the orientation of the adapter hub and the chuck body is unknown. Unless the orientation happens to be so precise that each pair of pins 434 will precisely hit the ends of the slots 508, three of the pins will engage the slots while the other three pins will be compressed, against their spring biases, by the areas of the adapter face between the slots 508. With the chuck body locked axially to the hub 506, rotation of the chuck body will allow all six pins to engage in their driving positions, at the ends of the slots 508, so that rotary power will be transferred from the chuck to the adapter, and thus to the unit under test, in either direction. Pneumatic power is applied to the chuck to advance, retract, and unlock the knob while not testing through a pneumatic connector 450. This connector is supported on a nonrotating portion of the seal plate 430.

The sequence of operation of the pin drive system is as follows:
1. The chuck is retracted and the mating adapter hub fixed to the unit under test in the prep area is presented for automatic connection.
2. The high speed spindle shaft 418 and the pin drive system are static or nonrotating.
3. The pneumatic seal plate 430 is advanced by the actuators 426 and creates sealed pneumatic paths between the pneumatic passages within the seal plate 430 and chuck base 407.
4. Pneumatic power is applied to release the ball chuck within the cone 424.

5. Pneumatic power is applied to advance the chuck through the drive piston 440.
6. The drive pins 434 move forward with the chuck body. Longitudinal guides for the chuck body movement are provided by its splined engagement with the housing 406, the front housing cap, and the drive piston 440.
7. The locating cone 424 in the chuck body engages the mating alignment knob 506 on the adapter hub, positioning the chuck and hub concentrically.
8. Three of the six drive pins 434 engage the adapter hub drive slots 508 and the three drive pins between them are compressed against their spring biases by contact with the sections between the slots.
9. Pneumatic power is removed from the ball chuck allowing the spring actuated lock within the ball chuck to secure the chuck body to the adapter hub knob 506.
10. Pneumatic power is removed from the drive piston 440 to stop advance motion of the pin drive system.
11. Torque is applied to the pin drive system chuck base through the high speed spindle shaft 418.
12. The rotating chuck body slips relative to the adapter hub 500 until the three engaged drive pins contact the ends of the radial slots.
13. The three compressed drive pins then extend into the back side of the adapter hub radial slots 508 removing potential backlash from the pin drive system and allowing reverse rotation.
14. Power is transferred from the high speed spindle shaft 418 through the pin drive system to the adapter hub.
15. After testing is completed the rotation of the high speed spindle, the pin drive system, and the adapter head is stopped.
16. Pneumatic power is applied to release the ball lock allowing the adapter hub 500 to be freed.
17. Pneumatic power is provided to the drive piston rear side to retract the chuck body away from the adapter hub.

Having thus described our invention, we claim:

1. A rotary connector for transferring power between first and second rotatable shafts, comprising:
    an elongated spindle shaft having first and second ends with the first end connected to the first rotatable shaft;
    a plurality of ball bearings supported along the length of the spindle shaft;
    a two part separable rotary connector having one part connected to the second end of the spindle shaft and the other part connected to said second rotatable shaft; and
    an actuator adapted to move one part of the separable rotary connector along the axis of the spindle shaft between a retracted position wherein the other part of the separable rotary connector can be moved into position relative to the first part of the separable rotating connector, and an extended position in which the first part of the separable rotary connector makes rotary driving connection with the second part of the separable rotary connector;
    wherein the first part of the rotary connector comprises a first plate moveable between said extended and retracted positions and carrying a plurality of spring biased pins supported for motion along the axis of the rotary connector at regularly spaced intervals in a circular pattern about said plate, and the second section comprises a second plate having a circular array of semicircular lobes spaced along the second plate, each lobe having two radial end sections having the same spacing as each pair of the pins on the first section, whereby upon the first part of the rotary connector moving from a retracted to an extended position in which it engages the second part, those pins which intersect the lobes on the second part enter the lobes, and the other pins are compressed against their spring biases, and upon rotation of the first part relative to the second part two adjacent pins in the first section enter the opposed radial end sections of each lobe to create a rotary driving connection between the first part and the second part.

2. The rotary connector of claim 1, further comprising a gearset connected between the first rotatable shaft and the first end of the spindle shaft.

3. The rotary connector of claim 2 in which the gearset is a planetary gearset.

4. The rotary connector of claim 3, wherein the planetary gearset comprises a ring gear, a planetary gear carrier, and a sun gear, with the first rotatable shaft connected to the ring gear and the first end of the spindle shaft connected to the sun gear.

5. A rotary connector for transferring power between first and second rotatable shafts, comprising:
    a planetary gear set comprising a planet gear carrier, a ring gear, and a sun gear, having one of said gear set elements connected to said first rotatable shaft;
    an elongated spindle shaft having first and second ends with the first end connected to another element of the planetary gear set;
    a plurality of ball bearings supported along the length of the spindle shaft;
    a two part separable rotary connector having one part connected to the second end of the spindle shaft and the other part connected to said second rotary shaft; and
    an actuator adapted to move one part of the separable rotary connector between a retracted position wherein the other part of the separable rotary connector can be moved into position relative to the first part of the separable rotating connector, and an extended position in which the first part of the separable rotary connector makes rotary driving connection with the second part, whereby the said first and second rotatable shafts rotate at a speed ratio determined by said planetary gear set;
    wherein the first section of the rotary connector comprises a first plate moveable between said extended and retracted positions and carrying a plurality of spring biased pins supported for motion along the axis of the rotary connector at regularly spaced intervals in a circular pattern about said plate; and the second section comprises a second plate having a circular array of semicircular lobes spaced along the second plate, each lobe having two radial end sections having the same spacing as each pair of the pins on the first section, whereby upon the first section of the connector moving from a retracted to an extended position it engages the second section, and those pins which intersect the lobes on the second section enter the lobes, and the other pins are compressed against their spring biases, and upon rotation of the first section relative to the second section two adjacent pins in the first section enter the radial end section of each lobe to create a rotary driving connection between the first section and the second section.

6. A clutch for transferring rotary motion from a first shaft to a second shaft, comprising:
    a first member coupled to said first shaft and having a first planar surface extending normally to the axis of the first shaft, supported for motion along the axis of the driving shaft between retracted and extended positions;
    a plurality of pins arrayed at spaced intervals in a circular configuration about the face of said first planar surface; the pins being supported for movement along the axis of the first shaft between retracted positions in which one end of each pin is flush with the first surface and extended positions in which the pins project beyond the first surface, each pin being spring loaded in an extended direction; and a second planar surface supported relative to the second shaft, said second surface formed with a plurality of semicircular lobes disposed at spaced intervals about the second surface in a circular configuration, each lobe having its end points spaced at the same angular intervals as the pins are spaced on the first surface;

an actuator for moving said first and second surfaces into and out of abutment with one another; whereas, when the surfaces are brought into abutment with one another, a first plurality of pins will enter the lobes and a second plurality of pins will be pressed against their spring bias into their retracted positions and upon rotation of the first surface to the second surface, the pins which have entered the lobes will move against the end points of the lobes and the pins that have been forced into a retracted position will extend into the opposite ends of the lobes, to form a driving connection between the first shaft and the second shaft.

7. A system for testing a gearbox having a rotational power input shaft and a rotational power output shaft, comprising:

a positioning mechanism for supporting said gearbox in a predetermined orientation;

an electric drive motor having an output shaft;

first rotary shafting having an input end driven by the motor output shaft and an output end coaxially aligned with said gearbox input shaft;

a first actuator for moving the output end of the first rotary shafting between a retracted position, separated from the gearbox input shaft to allow the gearbox to be moved into and out of said predetermined position, and an extended position in which the output end of the first shafting is in position to be joined in a driving relationship to the input shaft;

an electric generator having an input shaft;

second rotary shafting having an output end connected to the generator input shaft and an input end coaxially aligned with the output shaft of the gearbox; and a second actuator for moving the input end of the second shafting between a retracted position separated from the output shaft of the gearbox to allow the gearbox to be moved into and out of said predetermined position, and an extended position in which the input end of the second shafting is in driving position with the output shaft of the gearbox and may be joined in driving relation with the output shaft.

8. A test system for gearboxes having at least one input and at least one output, comprising:

a transportable test fixture having a surface adapted to receive a gearbox unit to be tested and support that gearbox in a predetermined position;

a wheeled cart for supporting and transporting said transportable test fixture;

a flexible test module comprising a clamp structure for securing said transportable test fixture and a gearbox to be tested supported on a test fixture in a predetermined position;

at least one drive motor;

at least one loading generator having its electric output connected to the drive motor;

a gearbox forming part of the test module and adapted to connect said drive motor to an input of said gearbox to be tested and said loading generator to an output of said gearbox to be tested.

9. The test system of claim 8, in which said gearbox forming part of the test module is removable from the test module to allow replacement with a different form of gearbox for testing gearboxes of a different design.

10. The test system of claim 8, in which a gearbox to be tested comprises a helicopter transmission having a main rotor drive mast projecting from the transmission body and said clamp structure engages said transmission and said mast through an adjustable gearbox actuator engagable with the mast and connected to a loading generator.

11. The test system of claim 10, further comprising an actuator connected to the torque actuator operative to apply an axial force on the helicopter mast.

12. The test system of claim 8, wherein said at least one drive motor and said at least one loading generator are alternating current devices powered by the electric output of the at least one loading generator is connected to the at least one drive motor by an alternating current-direct current convertor feeding a direct current bus and said at least one drive motor and at least one loading generator are powered by invertors connecting the variable frequency drives to the direct current bus.

13. The test system of claim 10, wherein said torque actuator is pivotably adjustable to accommodate a range of transmissions in which the main rotor drive masts bear different angular relationships to the transmission bodies.

14. A method of testing gearboxes having at least one input and one output for various parameters, employing a flexible test module, with said module comprising at least one drive motor adapted to connect an input of a gearbox to be tested and at least one loading motor adapted to be connected to an output of a gearbox to be tested, said method comprising:

loading the gearbox to be tested on a transportable test fixture, the fixture having a surface adapted to receive said gearbox and support it in a predetermined position;

supporting said fixture and the gearbox to be tested on a wheeled cart;

attaching sensors for at least certain of the testing parameters to the gearbox to be tested;

moving the wheeled cart into a predetermined position with respect to said test module;

connecting the drive motor to the input of the gearbox to be tested and the loading motor to the output of the gearbox to be tested;

performing a test routine powering the gearbox to be tested through the drive motor and loading the gearbox to be tested through the loading motor;

collecting the outputs of the sensors during the test routine; and removing the tested gearbox from the test module on the wheeled cart.

15. The testing method of claim 13, wherein the test module is adjustable to accommodate a number of different gearboxes for testing and the method comprises adjusting the module to the gearbox to be tested before moving the wheeled cart into position with respect to the test module.

16. The testing method of claim 15, wherein said at least one drive motor and said at least one loading motor are connected to the gearbox to be tested through test module gearboxes which are adjustable to accommodate a first range of gearboxes to be tested and said test module gearboxes are removable from the test module to allow replacement with different forms of test module gearboxes for testing gearboxes of different designs.

* * * * *